Jan. 11, 1944. M. H. MARTIN 2,338,952
TRUCK
Filed Oct. 10, 1942 2 Sheets-Sheet 2
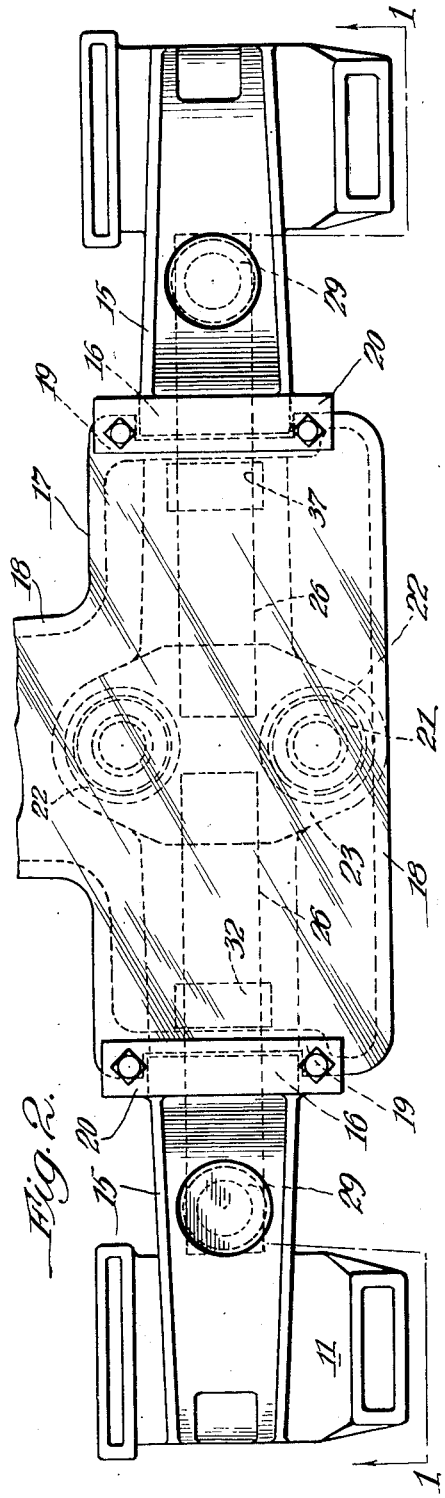
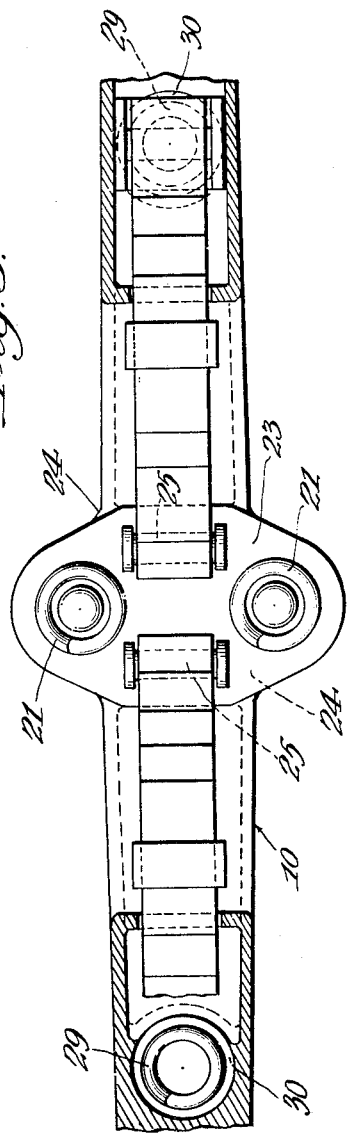
Inventor:
Mark H. Martin Patented Jan. 11, 1944

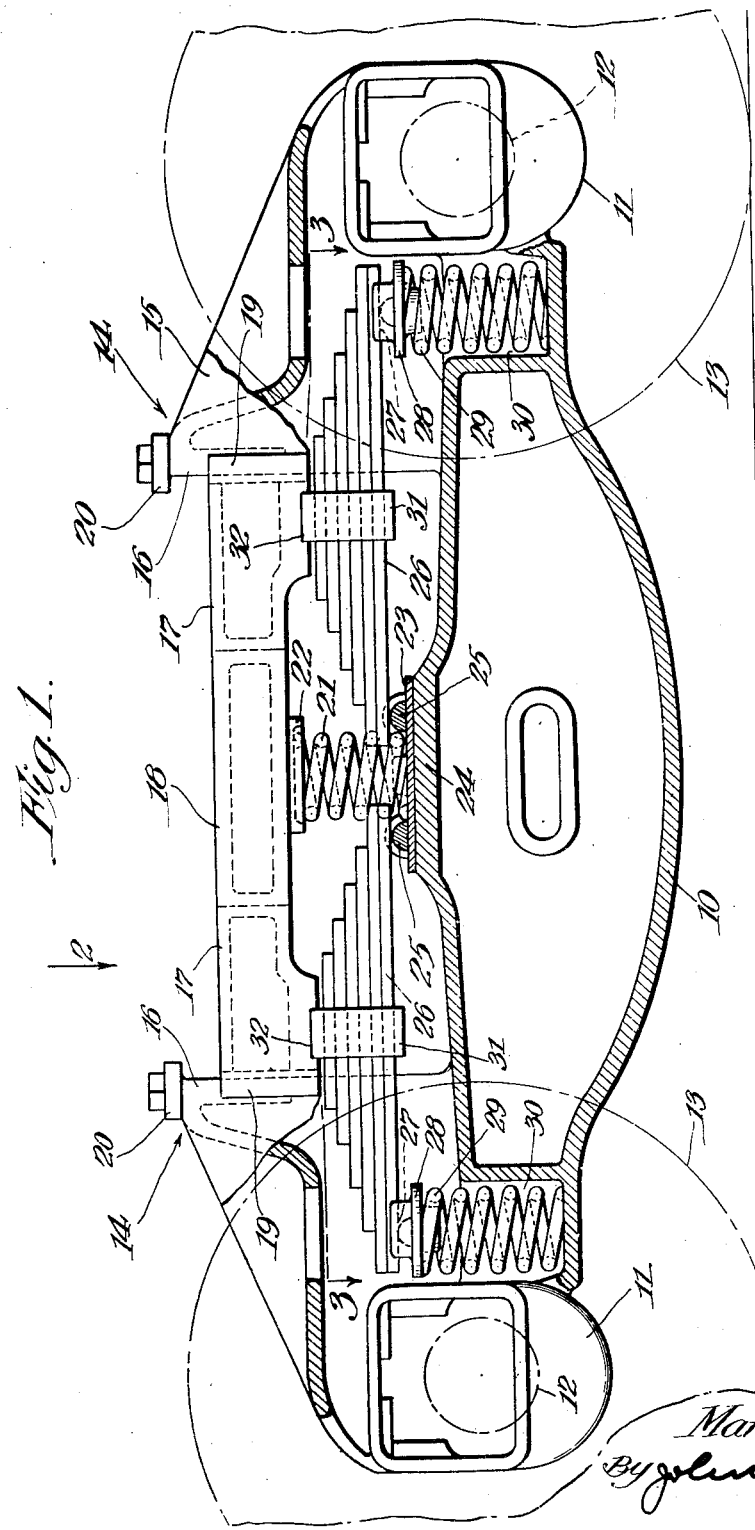

2,338,952

UNITED STATES PATENT OFFICE 2,338,952

TRUCK

Mark H. Martin, Reading, Pa., assignor to Birdsboro Steel Foundry and Machine Company, Birdsboro, Pa., a corporation of Pennsylvania Application October 10, 1942, Serial No. 461,557

11 Claims. (Cl. 105—197.1)

My invention relates to car trucks and more particularly to a truck for freight car service which is characterized by good riding qualities.

In the great majority of freight car trucks now in service, the spring suspension consists merely of a group of coil springs interposed between the end of the bolster and each side frame. This arrangement possesses the advantages of simplicity, economy and ease of maintenance but is objectionable in that, owing to track or wheel irregularities and the shocks imparted by rail joints, the group tends to oscillate at some operating speed of the car. This oscillating or vibrating action of the springs is due to their straight line action in compression and release, i. e., disregarding internal friction which is slight, the springs release about as much energy as that required to compress them, so that the car body, particularly one of high capacity and high gravity, rolls with a pendulum movement. When the vibration period of the springs synchronizes with the frequency of impulses transmitted to the truck by out of surface rail joints, or other track irregularities, the amplitude of the roll may increase sufficiently to cause derailment on curves or to drive the springs solid with accompanying transmission of uncushioned shocks through the truck to the rails and possible failure of the springs. This action is also a fruitful source of damage to the loading.

Various arrangements have been proposed to solve the above problem, including the use of snubbing devices for dampening the action of the coil springs and preventing vertical jiggle, a design which inclines towards stiffness if incorporating sufficient friction capacity, and various combinations of coil and energy absorptive springs, such as plate or leaf springs, which have a mutually dampening action.

My improved truck includes spring groups of the latter class and one object thereof is to provide a non-synchronous, spring assembly which is fully effective over the range of light to heavy loads and definitely functions to provide a softer cushioning action under light loads.

A further object is to provide a truck equipped with a spring suspension having the foregoing characteristics and wherein the distribution of load through the suspension is such that a portion thereof is imposed on the side frame adjacent the journal boxes and the remainder in an intermediate location.

A further object is the provision of a truck having side frames of the beam type in which the major resilient elements of the indicated spring assembly are arranged in parallel, load transfer relation.

A further object is to provide a car truck of the above type wherein the work absorptive springs are disposed to cushion shocks originating at the journal boxes before reaching the bolster and are particularly effective under light loads.

These and further objects of my invention will be set forth in the following specification, reference being had to the accompanying drawings, and the novel means by which said objects are effectuated will be definitely pointed out in the claims.

In the drawings:

Fig. 1 is a sectional elevation of my improved truck taken along the line 1—1 in Fig. 2.

Fig. 2 is a plan view of one side frame and the cooperating end of the truck bolster as viewed in the direction of the arrow 2 in Fig. 1.

Fig. 3 is a section along the line 3—3 in Fig. 1.

Referring to the drawings, the numeral 10 designates a side frame having a box section and which is of the beam type as distinguished from truss construction. Journal boxes having conventional brasses and wedges (not shown), are provided at the ends of the frames for the reception of the usual journals 12 having wheels 13 secured thereto.

Extending upwardly from adjacent the ends of the side frame are bolster columns 14 each of which comprises a pair of spaced brackets 15 whose outer ends merge into the side frame adjacent the journal boxes while the inner ends are connected by a vertical web 16. These webs provide bearing guides for wings 17 which project laterally from a truck bolster 18 whose intermediate portion may be conveniently arranged for cooperation with a body bolster or other part of the car body. Endwise movement of the bolster 18 relative to the side frame is prevented by spaced flanges 19 which extend beyond the ends of the wings 17 and slidably embrace the brackets 15. Inwardly extending lugs 20 at the upper ends of the webs 16 limit upward movement of the bolster 18 and prevent separation thereof from the side frames in the event of derailment.

Each end of the bolster is supported on a side frame by a non-synchronous spring assembly comprising coil and work absorptive or leaf springs. Specifically, a cluster of coil springs 21 is interposed between an upper spring plate 22 which bears against the under side of the bolster 18 and a lower spring plate 23 which rests on a spring seat 24 centrally provided on the compression web of the side frame 10. In the design shown, two coil springs 21 are spaced transversely of the side frame and in symmetric relation to and on opposite sides of the longitudinal center line of the frame. Additional coil springs may be employed in this position depending upon the operating conditions.

The spring plate 23 has secured thereto bosses 25 which are disposed between the springs 21 and spaced lengthwise of the side frame. Each boss is centrally recessed to receive the inner end of a work absorptive plate or leaf spring 26 whose opposite or outer end seats in a channel 27 provided in a spring cap 28 resting on the upper end of a coil spring 29 that is seated in a pocket 30 provided in the side frame adjacent one of the journal boxes 11. The central portion of each leaf spring 26 is encircled by a spring band 31 whose upper side seats in a pocket 32 provided in the under side of the cooperating bolster wing 17. As illustrated, the leaf springs extend longitudinally of and are symmetrically related on opposite sides of the vertical center line of the side frame.

Under operating conditions, the springs 21 and 26 operate in unison and in parallel load transfer relation to transmit loads to the side frame. Owing to the work-absorptive nature of the leaf spring 26, its natural period of vibration is different from that of the coil springs 21 so that these two kinds of springs exercise a mutual dampening action and inhibit any tendency to set up synchronous vibration. A similar dampening action occurs between the springs 26 and 29 which are series related. In this connection, the natural periods of vibration of the coil springs 21 and 29 may be different or the same, provided that they are different from the period of the leaf spring 26.

The springs 26 and 29 also act to cushion shocks originating at the journal boxes 11 and also provide softer action under loads that are too light to affect the higher capacity coil springs 21. In addition, the bolster wings 17 perform the dual service of guiding the bolster 18 between the columns 16 and of acting as a bearing member for the leaf springs 26.

Moreover, it will be understood from an inspection of Fig. 1 that, despite the relatively greater length of the bolster end compared to the usual arrangement in which the bolster extends through the window opening of a truss type of side frame, the springs are well distributed between the bolster and side frame, thus providing any critical loading areas on the side frame, enabling the latter to be formed with a simple shape and sections and corresponding light weight and reducing the rocking of the side frame in a vertical plane.

I claim:

1. In a truck, the combination of a side frame, a bolster operably related to the frame, and non-synchronous, resilient means supporting the bolster on the frame comprising coil spring means seated on the central portion of the frame and leaf springs each non-resiliently supported at one end on said central portion and resiliently supported at the opposite end at another point on the frame.

2. In a truck, the combination of a side frame, a bolster operably related to the frame, and non-synchronous, resilient means supporting the bolster on the frame comprising coil spring means seated on the central portion of the frame and aligned leaf springs each non-resiliently supported at one end on said central portion and at the opposite end resiliently supported at another point on the frame.

3. In a truck, the combination of a side frame, a bolster operably related to the frame, and non-synchronous resilient means supporting the bolster on the frame comprising coil spring means seated on the central portion of the frame, leaf springs each non-resiliently supported at one end on said central portion, and a coil spring resiliently supporting the other end at another point on the frame.

4. In a truck, the combination of a side frame, a bolster operably related to the frame, and non-synchronous resilient means supporting the bolster on the frame comprising coil spring means seated on the central portion of the frame, aligned leaf springs each non-resiliently supported at one end on said central portion, and a coil spring supporting the other end at another point on the frame.

5. In a truck, the combination of a side frame having journal boxes, a bolster operably related to the frame, and non-synchronous resilient means supporting the bolster on the frame comprising coil spring means seated on the central portion of the frame and leaf springs each non-resiliently supported at one end on said central portion and resiliently supported at the opposite end on the frame adjacent a journal box.

6. In a truck, the combination of a side frame having journal boxes, a bolster operably related to the frame, and non-synchronous resilient means supporting the bolster on the frame comprising coil spring means seated on the central portion of the frame and aligned leaf springs each non-resiliently supported at one end on said central portion and resiliently supported on the frame adjacent a journal box.

7. In a truck, the combination of a side frame having journal boxes, a bolster operably related to the frame, and non-synchronous resilient means supporting the bolster on the frame comprising coil spring means seated on the central portion of the frame, leaf springs each non-resiliently supported at one end on said central portion, and a coil spring supporting the other end on the frame adjacent a journal box.

8. In a truck, the combination of a side frame having journal boxes, a bolster operably related to the frame, and non-synchronous resilient means supporting the bolster on the frame comprising coil spring means seated on the central portion of the frame, aligned leaf springs each non-resiliently supported at one end on said central portion, and a coil spring supporting the other end on the frame adjacent a journal box.

9. In a truck, the combination of a beam type side frame having bolster columns, a bolster having lateral wings slidably engaging the columns, and non-synchronous resilient means supporting the bolster on the frame comprising coil spring means seated on the central portion of the frame and a pair of aligned leaf springs extending lengthwise of the frame with the coil spring means disposed therebetween, the intermediate portion of each leaf spring having bearing engagement with a wing and being non-resiliently supported at one end on said central portion and resiliently supported at another point on the frame.

10. In a truck, the combination of a beam type side frame having a box section including a compression web and a tension web, a bolster operably related to the frame, non-synchronous resilient means supporting the bolster on the frame comprising coil spring means seated on the central portion of the compression web and leaf springs each non-resiliently supported at one end on said central portion, and a coil spring seated on the tension web at another part of the frame and supporting the opposite end of said leaf spring.

11. A beam type side frame having a journal box at each end and an intermediate box section including a compression web and a tension web, a coil spring seat on the central portion of the compression web, leaf spring seats on the compression web immediately adjacent and on opposite sides of the coil spring seat, and a coil spring pocket adjacent each box and including a portion of the tension web.

MARK H. MARTIN.